United States Patent [19]

Maitland et al.

[11] 4,054,788
[45] Oct. 18, 1977

[54] MODULAR BINARY HALF-ADDER

[75] Inventors: David Steven Maitland; Sandy Lee Chumbley, both of Loveland; Havyn E. Bradley, Fort Collins, all of Colo.

[73] Assignee: Hewlett-Packard Company, Palo Alto, Calif.

[21] Appl. No.: 693,063

[22] Filed: June 4, 1976

[51] Int. Cl.² ............................................. G06F 7/50
[52] U.S. Cl. .................... 364/786; 307/216; 328/159
[58] Field of Search ............. 235/168, 175; 307/216; 328/159

[56] References Cited

U.S. PATENT DOCUMENTS

| 2,956,182 | 10/1960 | Norman | 328/159 X |
| 3,767,906 | 10/1973 | Pryor | 235/175 |
| 3,843,876 | 10/1974 | Fette et al. | 235/175 |
| 3,932,734 | 1/1976 | Parsons | 235/175 |
| 3,989,940 | 11/1976 | Kihara | 235/175 |

OTHER PUBLICATIONS

R. K. Richards, *Arithmetic Operations in Digital Computers*, © D. van Nostrand Company, Inc., 1955, pp. 83-85.

Primary Examiner—Jerry Smith
Attorney, Agent, or Firm—Michael L. Sherrard

[57] ABSTRACT

Half-adder logic modules employing separate summing and carry circuitry are used in the construction of a modular binary half-adder. Carry bits of less significant digits are calculated independent of and prior to the calculation of corresponding sum bits, thus allowing rapid propagation of such carry bits to more significant digits and subsequent parallel summation of the sum bits using the carry bits previously calculated.

10 Claims, 3 Drawing Figures

MODULAR BINARY HALF-ADDER

BACKGROUND AND SUMMARY

Many computers and calculators have requirements for registers wherein the binary contents can be incremented or decremented by 1. Such registers are known as half-adders. The speed of a binary half-adder is limited, in part, by the speed at which any carry bit resulting from the summation of the binary content of a logic cell and the carry bit input to such logic cell can be propagated to the sequent more significant bit logic cell. Prior art binary half-adders are disadvantageous in that the carry bit from a less significant bit within the half-adder cannot be propagated to the next more significant bit until summation calculations for the less significant digit have been completed.

A full-adder, i.e. a register whose binary contents can be summed with the contents of a second register, which employs separate summing and carry circuitry is disclosed in a co-pending Patent Application entitled BINARY ADDER, Ser. No. 650,211 filed Jan. 19, 1976 by David Steven Maitland and Billy E. Thayer. However, the use of a full-adder for a special half-adder application is wasteful of speed, power and space, and a specialized and simplified half-adder is desired.

Accordingly, it is the principal object of this invention to provide a modular binary half-adder having the capability of propagating carry bit signals prior to the modification of the register content.

It is a further object of this invention to provide a modular binary half-adder having the capability of updating all of the bits in a binary register in one parallel operation subsequent to the propagation of the carry bit signals.

This and other objects have been accomplished in accordance with the preferred embodiment of the invention by the use of a modular binary half-adder having separate summing and carry circuitry. The status of the output carry signal from any logic cell is precalculated as a function of an input carry signal and the contents of the associated storage element. Subsequently, the summation operations are carried out upon all the storage elements in one parallel operation in response to the preset carry signals and the contents of the associated storage elements.

DESCRIPTION OF THE PREFERRED EMBODIMENT

Figure 1:
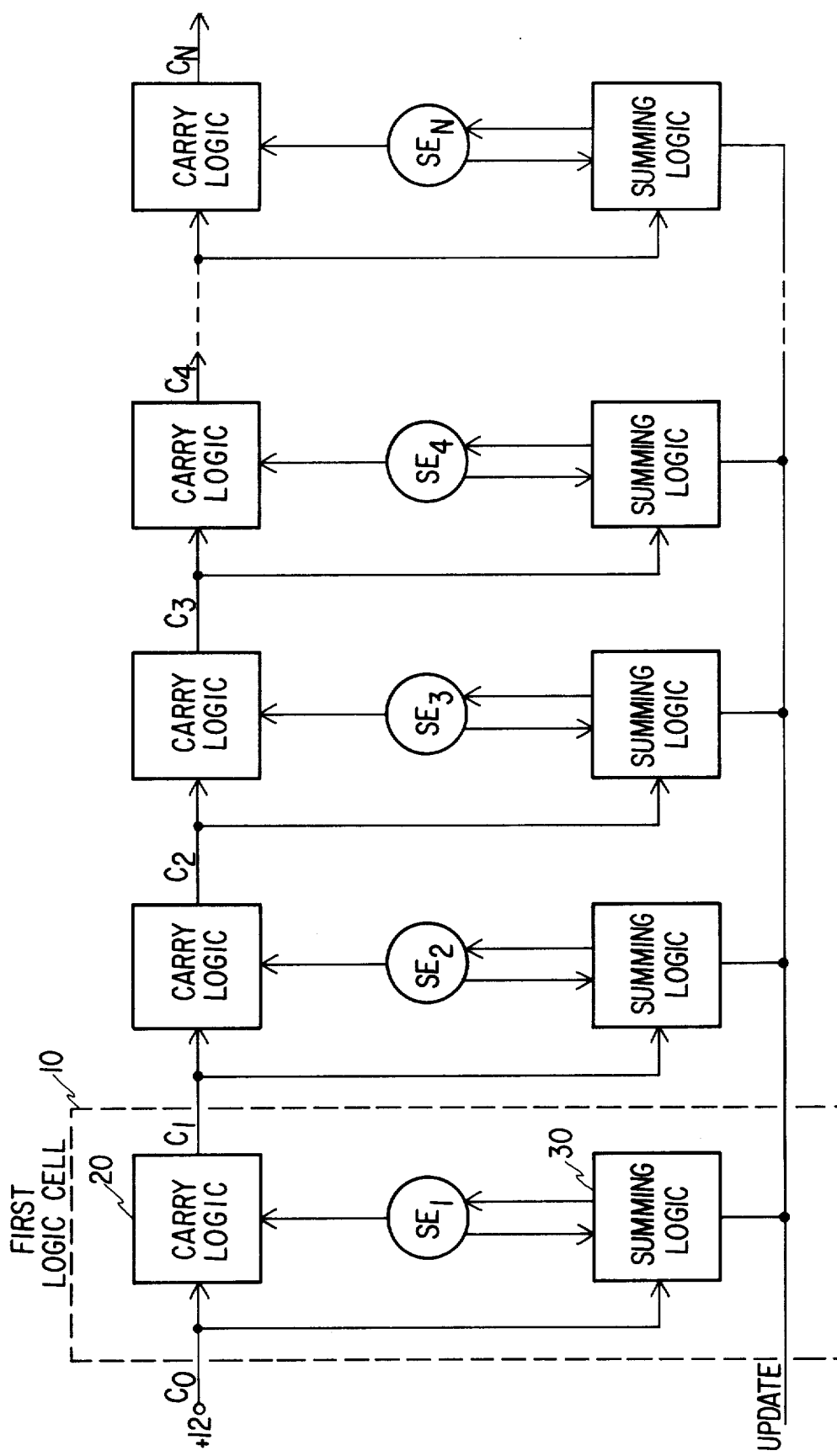
FIG. 1 is a block diagram of a modular binary half-adder embodying the present invention.

Referring to FIG. 1, there is shown a block diagram of a modular binary half-adder embodying the present invention. The bits of a binary number A are stored individually in storage elements $SE_1$ through $SE_N$. The least significant bits (LSB) is stored in storage element $SE_1$. A carry signal is applied to the carry input line $C_0$ of the first logic cell 10 for the purpose of incrementing (or decrementing) the binary number A by 1. The carry logic 20 of the first logic cell determines the output carry signal, $C_1$, from the input carry signal, $C_0$, and the content of the storage element $SE_1$. The carry logic 20 is responsive to the initial content of the storage element, $SE_1$, prior to the modification of its content by subsequent summing operations. In this manner the carry signals can be stabilized a very short time after a change is made to the contents of the storage elements and, in fact, the carry signals are usually preset by the time an update request is made to increment the register content. When adequate time has been allowed from the last update request to assure stabilization of the carry signals, a new update request is made simultaneously to all of the logic cells. The summing logic blocks, including the first summing block 30, then update the content of each storage element in parallel in response to the signal on the associated storage element. The updated contents stored in the storage elements will be subsequently referred to as $SE_1'$ through $SE_N'$.

The sequence of operations therefore begins with an UPDATE request being applied to the summing logic blocks. The summing logic blocks, in parallel, alter the contents of the storage elements in response to the preset input carry signals and the associated 'original' contents of the storage elements $SE_1$ through $SE_N$. The carry logic blocks automatically update the input carry signals by means of a rapidly cascading logic flow working from $C_0$ to $C_N$. The half-adder is then ready for another UPDATE request.

The alternative logic states of a particular logic cell operating as described above are given in Table 1, below:

TABLE 1

| Inputs: | $SE_N$ | 0 | 0 | 1 | 1 |
|---|---|---|---|---|---|
|  | $C_{N-1}$ | 0 | 1 | 0 | 1 |
| Outputs: | $C_N$ | 0 | 0 | 0 | 1 |
|  | $SE_N'$ | 0 | 1 | 1 | 0 |

Considering that the carry logic operates upon the initial content of a storage element and a preset input carry signal, the operation of the carry logic can be defined by the Boolean relationships:

$$\text{IF } C_{N-1} \cdot SE_N = 1, \text{ THEN } C_N = 1; \text{ and} \tag{1}$$

$$\text{IF } C_{N-1} \cdot SE_N = 0, \text{ THEN } C_N = 0. \tag{2}$$

The operation of the summing logic, which operates on the initial content of a storage element and an input carry signal upon an update request can be defined by the Boolean relationships:

$$\text{IF } C_{N-1} \cdot \text{UPDATE} = 1, \text{ THEN } SE_N' = \overline{SE_N}; \text{ and} \tag{3}$$

$$\text{IF } C_{N-1} \cdot \text{UPDATE} = 0, \text{ THEN } SE_N' = SE_N. \tag{4}$$

Figure 2:
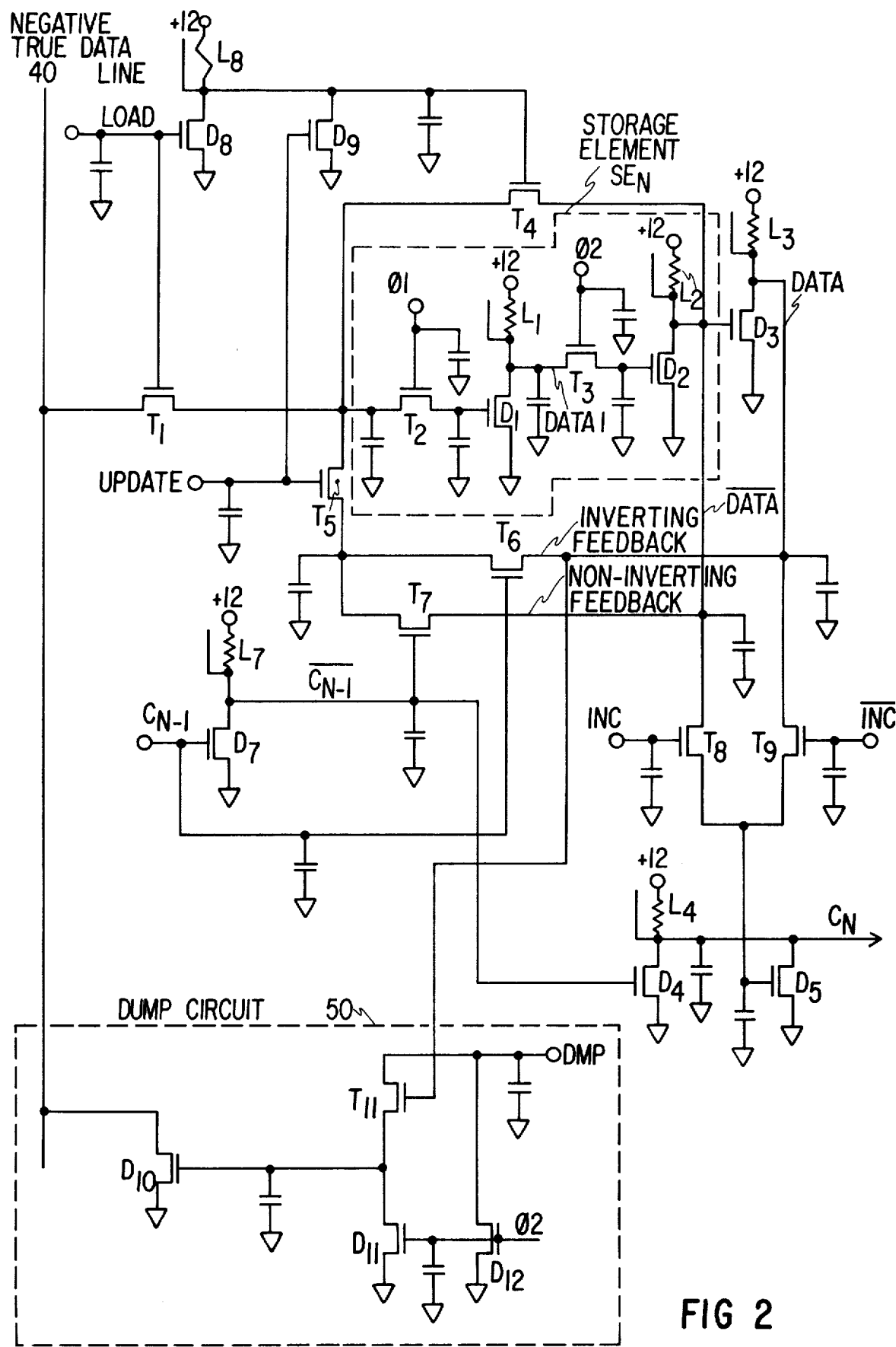
FIG. 2 is a detailed schematic diagram of a logic cell illustrating the preferred embodiment of the present invention.
Figure 3:
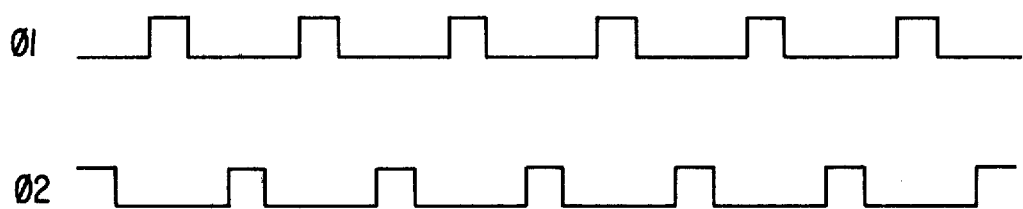
FIG. 3 is an illustration of the time relationship between alternately pulsed clock signals $\phi 1$ and $\phi 2$.

A detailed schematic of a logic cell illustrating the preferred embodiment of the present invention is shown in FIG. 2. The capacitances illustrated are residual capacitances of related Field Effect Transistors (FETs), useful in understanding the circuit operation, but are not individual components. FETs T2, D1, T3, $D_2$, $L_1$ and $L_2$ comprise the storage element $SE_N$ of the illustrated logic cell. The signals $\phi 1$ and $\phi 2$ are alternately pulsed clock signals with the time relationship shown in FIG. 3. A $\phi 1$ pulse activates the transfer FET T2 and allows a signal to be stored upon the gate of FET D1. The signal upon the gate of FET D1 is inverted by FETs D1 and L1 and the complement of the signal placed upon the gate of FET D1 is designated as DATA 1. The sequent $\phi 2$ pulse activates transfer FET T3 and stores the signal DATA 1 upon the gate of FET D2. The signal DATA 1 is inverted by FETS D2 and L2 and is designated as signal $\overline{\text{DATA}}$. By sequentially pulsing the clock signals $\phi 1$ and $\phi 2$ and applying the $\overline{\text{DATA}}$ line to the input of FET T2, as is normally done by the activation of FET T4 (the recirculation logic), the content of the storage element is periodically 'refreshed' and the complement of the stored data is available as $\overline{\text{DATA}}$ at the output of FET D2. Note that the FETs prefixed by the letter "T" are used as transfer gates, the FETs prefixed by the letter "D" are used as drivers and often as storage elements, and FETs prefixed by the letter "L" are used as loads. Note also that in the subsequent discussion of the preferred embodiment a logical "1" indicates a charged logic state and a logical "0" will indicate a grounded, or low, logic state on a storage element or upon a data line, though a person skilled in the art will appreciate that the use of complementory logic, i.e. a logical "1" indicating an uncharged state, would be equivalent to the preferred embodiment of the present invention.

Data is loaded into the above described storage element by applying a logical "1" to the gate of FET T1 via the LOAD line. The data signal on the negative true data line 40 is then transferred through FETs T1 and T2 to the gate of FET D1 upon a $\phi 1$ pulse. The logical "1" applied to the gate of FET T1 via the LOAD line also activates FET D1 which deactivates FET T4, the recirculate logic, during the loading operation.

The carry logic determines the state of the output carry line $C_N$. The output carry signal, $C_N$, is a logical "1" when FETs D4 and D5 are off. If either FET D4 or D5, or if both FETs D4 and D5, are on, the output carry signal $C_N$ is a logical "0". If the input carry line $C_{N-1}$ is a logical "0", the $C_{N-1}$ signal is inverted by FETs D7 and L7, and the complementary signal $\overline{C_{N-1}}$ turns FET D4 on. If the $\overline{\text{DATA}}$ line is a logical "1", i.e. it shows that the storage element contains DATA 1 equal to a logical "0", and an INC (increment) signal is applied to the gate of FET T8, FET D5 is turned on, bringing the $C_N$ line to ground (a logical "0"). Therefore a carry out signal is applied to $C_N$ only if the storage element $SE_N$ contains a logical "1" and a carry in signal $C_{N-1}$ is a logical "1" in accordance with the truth table, TABLE 1.

The summing logic is also based upon the truth table given in TABLE 1, above. When no carry is applied to the logic cell ($C_{N-1}$ is a logical "0") there is no change in the content of the storage element $SE_N$. The summing logic is activated by the application of a signal to the UPDATE line. When the input carry signal $C_{N-1}$, is a logical "0", the gate of FET T7 is charged by the complementary $\overline{C_{N-1}}$ signal allowing the $\overline{\text{DATA}}$ signal to transfer through FETs T7 and T5 to the storage element $SE_N$ when the update request is applied to UPDATE, the gate of FET T5. When a carry signal is applied to the logic cell via carry line $C_{N-1}$, as it always will be to the LSB logic cell, the content of the storage cell is complemented. The $\overline{\text{DATA}}$ signal is inverted by FETs D3 and L3 to form a DATA signal, the DATA signal is transferred through FET T6, which is on as a result of the carry signal applied to $C_{N-1}$, and the DATA signal is further transferred through FET T5 to the input of the storage element $SE_N$ when the update request is applied to UPDATE. The UPDATE signal is therefore pulsed in phase with a $\phi 1$ pulse subsequent to the stabilization of the carry logic. The UPDATE signal also turns on FET D9 which disables FET T4, the recirculate path.

The recirculate logic is activated until the carry signals have propagated through the entire register. When enough cycles have occured to stabilize the carry signals and the associated logic cell logic paths, the UPDATE line is pulsed concurrently with a $\phi 1$ pulse and the storage element contents are modified according to the above described logic.

The preferred embodiment can operate as a decrementer, i.e. decrement the contents of the register by 1, upon an update request when reconfigured so as to implement the logic states illustrated by TABLE 2, below:

TABLE 2

| Inputs: | $SE_N$ | 0 | 0 | 1 | 1 |
|---|---|---|---|---|---|
| | $C_{N-1}$ | 0 | 1 | 0 | 1 |
| Outputs: | $C_N$ | 0 | 1 | 0 | 0 |
| | $SE_N'$ | 0 | 1 | 1 | 0 |

Comparing TABLES 1 and 2, the only change required in the logic is to alter the logic producing the carry out signal, $C_N$. Equations (1) and (2) are to be replaced by equations (1)' and (2)' as follows:

$$\text{IF } C_{N-1} \cdot \overline{SE_{N-}} = 1, \text{ THEN } C_N = 1; \text{ and} \quad (1')$$

$$\text{IF } C_{N-1} \cdot SE_N = 0, \text{ THEN } C_N = 0. \quad (2')$$

This is accomplished in the preferred embodiment by the use of FET T9, which applies the DATA signal to the gate of FET D5 and removes the charge from the $C_N$ line upon detection of an $\overline{\text{INC}}$ (decrement) signal and a DATA signal.

The data in the storage element $SE_N$ is dumped to the negative true, two phase precharged data line 40 by applying a signal to the DMP line on a $\phi 1$ pulse. If DATA is a logical "1", the signal applied to the DMP line will transfer through FET $T_{11}$ and discharge the precharged data line 40 through FET $D_{10}$. The DMP signal is discharged, $D_{10}$ turned off, and the data line 40 precharged during the sequent $\phi 2$ pulse in preparation for the next cycle. It is important to the operation of the dump circuit 50 that the dump circuit 50 has no DC drivers, such as an inverter circuit. This minimizes power and size requirements, and is a further improvement over the known prior art.

We claim

1. Binary half-adder module comprising:
  a storage element for retaining a logical bit of binary data in states corresponding to either a logical "1" or a logical "0", wherein the output can be monitored while the input is being changed;
  a first inverter responsive to the output of said storage element for providing a logical signal complementary to the logical output of said storage element;
  means for applying an input carry signal (corresponding to either a logical "1" or a logical "0") to said binary half-adder module;
  a second inverter responsive to said input carry signal for providing a logical signal complementary to said input carry signal;
  means for charging an output carry line;
  means for applying an increment signal to said binary half-adder module;
  means for discharging said output carry line upon detection of a charge on the logical output of said storage element and detection of said increment signal;

means for discharging said output carry line upon detection of said input carry signal corresponding to a logical "0";

means for applying a decrement signal to the binary half-adder module;

means for discharging said output carry line upon detection of a signal corresponding to a logical "1" on the output of said first inverter and detection of said decrement signal;

means for applying an update signal to an update signal line;

means for recirculating the contents of said storage element upon detection of signals corresponding to the logical "1" on the output of said second inverter and the update signal line; and means for loading the signal on the output of said first inverter into the storage element upon detection of said input carry signal and said signal on the update signal line each corresponding to a logical "1"

2. A binary counter comprising a plurality of binary half-adder modules as in claim 1 wherein the output carry line of one module comprises the means for applying an input carry signal to a second module.

3. A binary counter as in claim 2 wherein the update signal lines of said binary half-adder modules are a line common to all other binary half-adder modules included in said binary counter.

4. A binary logic module adapted to receive a first input signal I, a second input signal $\bar{I}$ complementary to the first input signal, and a carry-in signal C, said module for providing a carry-out signal K and an output signal S, each signal having a voltage level corresponding to either a logical "1" or a logical "0", the module comprising:

first MOS inverter logic means responsive to the carry-in signal C for providing a first control signal in response to the carry-in signal C corresponding to a logical "0" and for providing a second control signal in response to the carry-in signal C corresponding to a logical "1";

means for presetting the carry-out signal K to a first predetermined voltage level corresponding to a logical "1";

MOS carry logic means coupled to receive the first control signal and the second input signal $\bar{I}$ for setting the carry-out signal K to a second predetermined voltage level corresponding to logical "0" in response to either receiving a first control signal or in response to receiving a second input signal $\bar{I}$ corresponding to a logical "1"; and MOS output logic means coupled to receive the first and second control signals, the first input signal I, and the second input signal $\bar{I}$, for providing an output signal S corresponding to the input signal I in response to receiving the first control signal and for providing an output signal S corresponding to the complementary signal $\bar{I}$ in response to receiving the second control signal.

5. A binary logic module as in claim 4 further adapted to receive an increment signal P and a decrement signal M, wherein said MOS carry logic means is further coupled to receive the first input signal I, and further comprises means for selectively receiving the first input signal I only in response to receiving a decrement signal M, and for selectively receiving the second input signal $\bar{I}$ only in response to receiving an increment signal P, said MOS carry logic means further comprising means for setting the carry-out signal K to the second predetermined voltage level corresponding to a logical "0" in response to receiving a first input signal I corresponding to a logical "1".

6. A binary half-adder module comprising a binary logic module as in claim 4 and further comprising:

a delay element for retaining a logical bit of binary data in states corresponding to either a logical "1" or a logical "0", said delay element having an input and an output wherein said delay element applies a signal to the output thereof corresponding to a signal previously applied to the input thereof, the input thereof coupled to said MOS output logic means to receive the sum signal S; and a first inverter responsive to the signal on the output of said delay element, said inverter for providing a logical signal complementary to the signal upon the output of said delay element, the signal on the output of said delay element and the logical signal provided by said first inverter providing the first and second input signals I and $\bar{I}$ to said binary logic module.

7. A binary counter comprising a plurality of binary half-adder modules as in claim 6 wherein the output carry line of one module comprises the means for applying an input carry signal to a second module.

8. A binary counter as in claim 7 wherein the update signal line of said binary half-adder modules is a line common to all other binary half-adder modules included in said binary counter.

9. A binary half-adder module as in claim 6 wherein said first MOS inverter logic means and said MOS carry logic means each comprise a resistive element in series with a MOSFET.

10. A binary half-adder module as in claim 9 wherein said MOS carry logic means comprises two MOSFETS with gates coupled to the first control signal and second input signal $\bar{I}$, respectively, drains coupled to signal line means for propagating the carry-out signal K, and sources coupled to a source of the second predetermined level.

* * * * *